(12) United States Patent
Blecharczyk et al.

(10) Patent No.: US 11,257,010 B2
(45) Date of Patent: *Feb. 22, 2022

(54) AUTOMATED DETERMINATION OF BOOKING AVAILABILITY FOR USER SOURCED ACCOMMODATIONS

(71) Applicant: Airbnb, Inc., San Francisco, CA (US)

(72) Inventors: Nathan Blecharczyk, San Francisco, CA (US); Maxim Charkov, San Francisco, CA (US); Matt Weisinger, San Francisco, CA (US); Riley Newman, San Francisco, CA (US); Joseph Zadeh, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/581,681

(22) Filed: Sep. 24, 2019

(65) Prior Publication Data

US 2020/0019892 A1 Jan. 16, 2020

Related U.S. Application Data

(63) Continuation of application No. 13/802,025, filed on Mar. 13, 2013, now Pat. No. 10,467,553.

(51) Int. Cl.
*G06Q 10/02* (2012.01)
*G06Q 10/06* (2012.01)
*G06Q 50/14* (2012.01)

(52) U.S. Cl.
CPC ............ *G06Q 10/02* (2013.01); *G06Q 10/06* (2013.01); *G06Q 50/14* (2013.01)

(58) Field of Classification Search
CPC ......... G06Q 10/02; G06Q 10/06; G06Q 50/14
See application file for complete search history.

(56) References Cited

U.S. PATENT DOCUMENTS

| 5,864,818 A | 1/1999 | Feldman |
| 6,061,691 A * | 5/2000 | Fox .................... G06Q 10/087 |
| 6,671,697 B1 | 12/2003 | Thibodeau |
| 6,839,720 B1 | 1/2005 | Thibodeau |

(Continued)

FOREIGN PATENT DOCUMENTS

| CA | 2339065 A1 | 10/2000 |
| CN | 102880603 A | 1/2013 |

(Continued)

OTHER PUBLICATIONS

Mcgraw-hill, "Textbook of Front Office Management and Operation", Copyright 2008 (Year: 2008).*

(Continued)

*Primary Examiner* — Omar Zeroual
(74) *Attorney, Agent, or Firm* — Fenwick & West LLP

(57) ABSTRACT

Methods and systems for updating a calendar entry for an accommodation listing are disclosed. In one embodiment, the method comprises generating an availability model and an acceptance model for an accommodation listing in an accommodation reservation system and determining based on those models the probability that the accommodation listing would be able to be booked. Furthermore, the result of an accommodation search query can be filtered and/or sorted using the determined probability of booking.

20 Claims, 8 Drawing Sheets

(56) References Cited

U.S. PATENT DOCUMENTS

| | | | |
|---|---|---|---|
| 6,885,998 B1 | 4/2005 | Arduino | |
| 7,069,228 B1 | 6/2006 | Rose et al. | |
| 7,076,451 B1 | 7/2006 | Coupland et al. | |
| 7,117,202 B1* | 10/2006 | Willoughby | G06Q 30/02 |
| 7,181,426 B2 | 2/2007 | Dutta | |
| 7,249,041 B2 | 7/2007 | Last | |
| 7,328,166 B1 | 2/2008 | Geoghegan et al. | |
| 7,584,110 B2 | 9/2009 | Robertson | |
| 7,761,305 B2 | 7/2010 | Mack | |
| 8,165,917 B2 | 4/2012 | Steigelfest | |
| 8,484,151 B1* | 7/2013 | Lookingbill | G06N 20/00 |
| | | | 706/46 |
| 8,583,562 B1* | 11/2013 | McDaniel | G06Q 10/10 |
| | | | 705/313 |
| 8,886,576 B1* | 11/2014 | Sanketi | G06K 9/00 |
| | | | 706/12 |
| 2001/0005831 A1 | 6/2001 | Lewin et al. | |
| 2001/0027481 A1 | 10/2001 | Whyel | |
| 2002/0103681 A1 | 8/2002 | Tolis et al. | |
| 2002/0116235 A1 | 8/2002 | Grimm et al. | |
| 2002/0186257 A1* | 12/2002 | Cadiz | G06F 16/9535 |
| | | | 715/838 |
| 2003/0004760 A1 | 1/2003 | Schiff et al. | |
| 2003/0220773 A1 | 11/2003 | Haas et al. | |
| 2005/0267787 A1 | 12/2005 | Rose et al. | |
| 2006/0022037 A1* | 2/2006 | Strothmann | G06Q 10/02 |
| | | | 235/384 |
| 2006/0069995 A1* | 3/2006 | Thompson | H04L 67/02 |
| | | | 715/700 |
| 2006/0155638 A1* | 7/2006 | de la Motte | G06Q 40/04 |
| | | | 705/37 |
| 2006/0173617 A1* | 8/2006 | Sladky | G01C 21/3679 |
| | | | 701/426 |
| 2006/0193251 A1 | 8/2006 | Huang | |
| 2006/0224439 A1* | 10/2006 | Smith | G06Q 10/087 |
| | | | 705/7.35 |
| 2007/0055555 A1* | 3/2007 | Baggett | G06Q 10/02 |
| | | | 705/5 |
| 2007/0067193 A1 | 3/2007 | Robertson | |
| 2007/0124181 A1* | 5/2007 | Feyder | G06Q 50/14 |
| | | | 705/5 |
| 2007/0156429 A1 | 7/2007 | Godar | |
| 2007/0156435 A1* | 7/2007 | Greening | G06Q 30/00 |
| | | | 705/1.1 |
| 2007/0299766 A1* | 12/2007 | Bril | G06Q 30/08 |
| | | | 705/37 |
| 2008/0048885 A1* | 2/2008 | Quinn | G08G 1/0141 |
| | | | 340/932.2 |
| 2008/0097873 A1* | 4/2008 | Cohen | G06Q 30/0603 |
| | | | 705/26.1 |
| 2009/0204600 A1* | 8/2009 | Kalik | G01C 21/30 |
| 2009/0307019 A1* | 12/2009 | Grussu | G06Q 10/02 |
| | | | 705/5 |
| 2010/0198628 A1* | 8/2010 | Rayner | G06Q 30/0256 |
| | | | 705/6 |
| 2010/0262440 A1 | 8/2010 | Rayner | |
| 2011/0106583 A1* | 5/2011 | Rozell | G06Q 30/02 |
| | | | 705/7.29 |
| 2011/0119099 A1* | 5/2011 | Waytena | G06Q 10/087 |
| | | | 705/5 |
| 2011/0288892 A1* | 11/2011 | Desy | G06Q 10/02 |
| | | | 705/5 |
| 2012/0166310 A1* | 6/2012 | Werklund | G06Q 30/0613 |
| | | | 705/26.41 |
| 2012/0239505 A1* | 9/2012 | Hu | G06Q 30/0207 |
| | | | 705/14.66 |
| 2013/0006777 A1* | 1/2013 | Krishnareddy | G06Q 10/04 |
| | | | 705/14.66 |
| 2013/0031506 A1* | 1/2013 | Diaz | G06Q 50/12 |
| | | | 715/781 |
| 2013/0275165 A1* | 10/2013 | Udagawa | G06Q 10/02 |
| | | | 705/5 |
| 2014/0156183 A1* | 6/2014 | Windeler | G08G 1/144 |
| | | | 701/454 |
| 2014/0164030 A1* | 6/2014 | Katagiri | G06Q 10/02 |
| | | | 705/5 |
| 2014/0222473 A1* | 8/2014 | Patel | G06Q 30/08 |
| | | | 705/5 |
| 2014/0278591 A1* | 9/2014 | Blecharczyk | G06Q 10/06 |
| | | | 705/5 |
| 2014/0365327 A1* | 12/2014 | Crossan | G06Q 30/08 |
| | | | 705/26.4 |
| 2015/0006265 A1* | 1/2015 | White | G06Q 30/0611 |
| | | | 705/14.3 |
| 2016/0140845 A1* | 5/2016 | Agrawal | G08G 1/146 |
| | | | 340/932.2 |

FOREIGN PATENT DOCUMENTS

| | | |
|---|---|---|
| JP | 2003-30510 A | 1/2003 |
| JP | 2003-203156 A | 7/2003 |
| JP | 2004-094809 A | 3/2004 |
| JP | 2005/70909 A | 3/2005 |
| JP | 2011/258079 A | 12/2011 |
| JP | 2013-15927 A | 1/2013 |
| KR | 10-2006-0005467 A | 1/2006 |
| KR | 10-2012-0081436 A | 7/2012 |
| WO | WO 2011/110194 A1 | 9/2011 |
| WO | WO 2013/001850 A1 | 1/2013 |

OTHER PUBLICATIONS

Anindya Ghose, "Designing Ranking Systems for Hotels on Travel Search Engines by Mining User-Generated and Crowdsourced Content", published by Marketing Science vol. 31, No. 3, May-Jun. 2012 (Year: 2012).*

Korean Intellectual Property Office, Office Action, Korean Patent Application No. 10-2015-7028614, dated Jun. 17, 2020, 15 pages.

China National Intellectual Property Administration, Third Office Action and Search Report, Chinese Patent Application No. 201480024966.7, dated Jun. 10, 2021, six pages (with concise explanation of relevance).

Chinese Office Action, Chinese Application No. 201480024966.7, dated Mar. 14, 2018, 14 pages (with concise explanation of relevance).

Chinese Patent Application No. 2014/80024966.7, dated Feb. 3, 2019, 19 pages.

Copyright 2008, McGraw-Hill publisher, Textbook of Front Office Management and operations, third reprint, p. 186-188.

CTrip.com, "E-Booking Help," [Online] Retrieved from the internet <URL: https://wenku.baidu.com/view/7b93c2323968011ca30091a6. html?sxts=1548580481963> (with concise explanation of relevance).

Japanese Office Action, Japanese Application No. 2016-501616, dated Feb. 20, 2018, 8 pages.

PCT International Search Report and Written Opinion, PCT Application No. PCT/US2014/024713, dated Jul. 14, 2014, 12 pages.

Singapore Examination Report, Singapore Application No. 11201507233W, dated Sep. 22, 2017, 5 pages.

Singapore Written Opinion, Singapore Application No. 11201507233W, dated Apr. 7, 2017, 5 pages.

Singapore Written Opinion, Singapore Application No. 11201507233W, dated Jul. 8, 2016, 7 pages.

United States Office Action, U.S. Appl. No. 13/802,025, dated Feb. 25, 2016, 28 pages.

United States Office Action, U.S. Appl. No. 13/802,025, dated Oct. 28, 2016, 33 pages.

United States Office Action, U.S. Appl. No. 13/802,025, dated Apr. 19, 2017, 13 pages.

United States Office Action, U.S. Appl. No. 13/802,025, dated Apr. 7, 2018, 24 pages.

United States Office Action, U.S. Appl. No. 13/802,025, dated Oct. 29, 2018, 31 pages.

United States Office Action, U.S. Appl. No. 13/802,025, dated Mar. 25, 2019, 16 pages.

(56) References Cited

OTHER PUBLICATIONS

United States Office Action, U.S. Appl. No. 13/802,025, dated Apr. 20, 2015, 22 pages.

* cited by examiner

AUTOMATED DETERMINATION OF BOOKING AVAILABILITY FOR USER SOURCED ACCOMMODATIONS

CROSS REFERENCE TO RELATED APPLICATIONS

This application is a continuation of prior, co-pending U.S. patent application Ser. No. 13/802,025, filed on Mar. 13, 2013, which is incorporated herein by reference in its entirety for all purposes.

TECHNICAL FIELD

This invention relates to accommodation booking systems and in particular to predicting the booking availability of an accommodation on previous booking history.

BACKGROUND ART

Some existing accommodation reservation systems, such as bed and breakfast reservation systems, or alternative lodging reservation systems, allow users to post accommodation offers for lodgings that they own or occupy. From single rooms in an apartment to entire castles, web services such as Airbnb™ or HomeAway™ let users offer their lodgings and showcase it to an audience of millions. In most cases, users of the accommodation reservation systems are not professional hoteliers and use the revenues obtained through the accommodation reservation system as a secondary income.

Accommodation reservation systems also let other users seeking for accommodation to obtain a unique travel experience by offering an unconventional type of lodging. Accommodation reservation systems match users looking for short term accommodation needs with other users seeking to rent their lodgings.

Users offering their accommodations to others enter information about the accommodation as well as information about the availability of the accommodation on various dates. Although the information provided is usually accurate, some information, such as the availability needs to be periodically updated. In most cases, the user posting an accommodation offer is responsible for keeping the availability information up to date, indicating which dates the accommodation will or will not be available. However, existing systems do not provide any way of ensuring that users in fact keep the availability information current. Since, for most users, the accommodation reservation system is not their primary source of income, they update their listings information sporadically. This may cause a user seeking for accommodation to obtain, in a search result, listings that seem to be available for the desired time period but that in reality they are unavailable. Users will then waste time reviewing listings that are do not match their needs. Those users may also request accommodation from those listing and/or send messages requesting additional information to the user posting the listing. This will reduce the confidence of the user requesting accommodation on the accommodation reservation system and might also decrease the likelihood that the user will get an accommodation through the accommodation reservation system.

SUMMARY

An accommodation reservation system can predict the availability of an accommodation for a given period of time, based on the accommodation's current listed availability and the past behavior of the accommodation's host in updating the availability information for the accommodation. In one embodiment, the accommodation reservation system uses a machine learned predictive model, herein called an availability model, to predict the availability of an accommodation.

The accommodation reservation system can also estimate a probability that, provided an accommodation is available, the guest's request for accommodation is going to be accepted by the host. In one embodiment, the accommodation reservation systems uses another machine learned predictive model, herein called an acceptance model, to predict the likelihood of acceptance based on information about the guest, information about the trip, and the host past behavior in accepting or declining accommodation requests.

Embodiments of the invention can also use the availability model and the acceptance model to rank the listings returned in response to a search query. Given a set of accommodations that satisfy a user's request for accommodations, the accommodation reservation system ranks higher all the accommodations that a guest is most likely to be able to obtain or book, using a function of the outputs of the availability model and the acceptance model. Other embodiments use those models to filter the search result and only display the listing with an availability probability and/or acceptance probability larger than a threshold.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
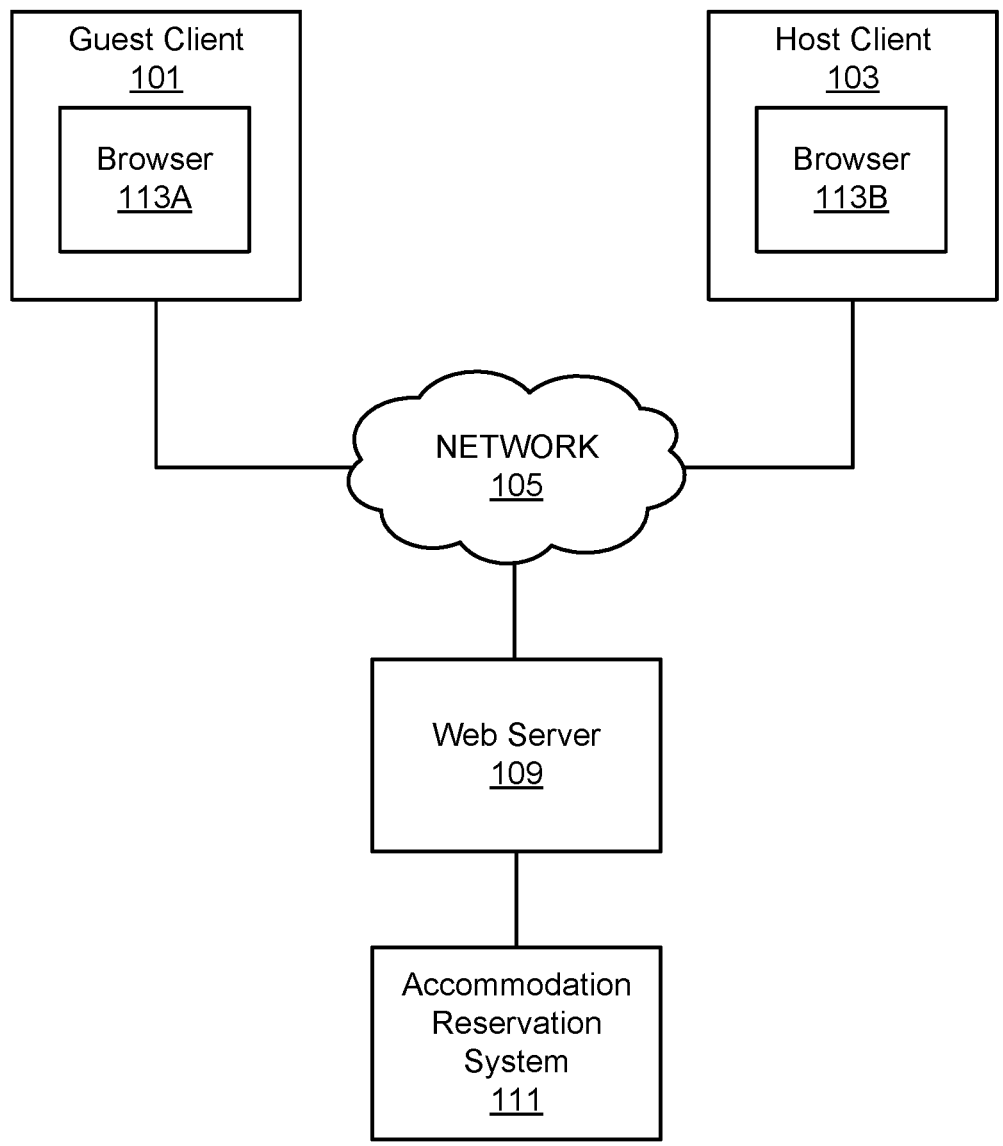
FIG. 1 is a system diagram of the accommodation reservation system, in accordance with an embodiment of the invention.

Referring now to FIG. 1, there is shown the system architecture adapted to support one embodiment of the present invention. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between the guest 101, the host 103 and the accommodation reservation system 111. In one embodiment, the network is the Internet. The network can also utilize dedicated or private communication links (e.g. WAN, MAN, or LAN) that are not necessarily part of the Internet. The network uses standard communications technologies and/or protocols.

The web server 109 presents web pages or other web content, which form the basic interface to the guest and host clients 101, 103. The guests and hosts use respective client devices 101, 103 to access one or more web pages, and provide data to the accommodation reservation system 111. In the context of this application, "data" is understood to include information about an accommodation, information about a trip, the host, the guest, and the like. For example, for information related to an accommodation, the data can include information such as price, room type, bed type, number of bedrooms, number of bathrooms, cleaning fee, check in time, check out time, location, size, cancellation policy, amenities, house rules, and the like. Also, for information about a trip, data can include information such as location, check in date, check out date, number of guests, room type preference, price range, desired amenities, and the like.

A guest is one type of user of the accommodation reservation system 111. Guests request accommodation from the accommodation reservation system 111 based on a set of trip parameters using a guest client device 101. The accommodation reservation system 111 then provides a list of potential accommodations that best match the trip parameters provided by the guest.

The host is another type of user of the accommodation reservation system 111. Host provides accommodation through the accommodation reservation system 111 based on a set of accommodation parameters using a host client device 103. The accommodation reservation system 111 lists the accommodations along with the accommodation parameters provided by the host. The accommodation reservation system 111 then tries to match the listed accommodation to one or more guests that may identify the listed accommodation suitable to their needs.

In one embodiment, the client devices 101, 103 are used by the guest and hosts for interacting with the accommodation reservation system 111. A client device can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The device executes an operating system, for example, a Microsoft Windows-compatible operating system (OS), Apple OS X or iOS, a Linux distribution, or Google's Android OS. In some embodiments, the client device 101, 103 may use a web browser 113, such as Microsoft Internet Explorer, Mozilla Firefox, Google Chrome, Apple Safari and/or Opera, as an interface to interact with the accommodation reservation system 111.

The accommodation reservation system 111 allows hosts to post accommodation listing and guests to search for and book accommodations. The accommodation reservation system 111 comprises additional components and modules that are described below.

Accommodation Reservation System

Figure 2:
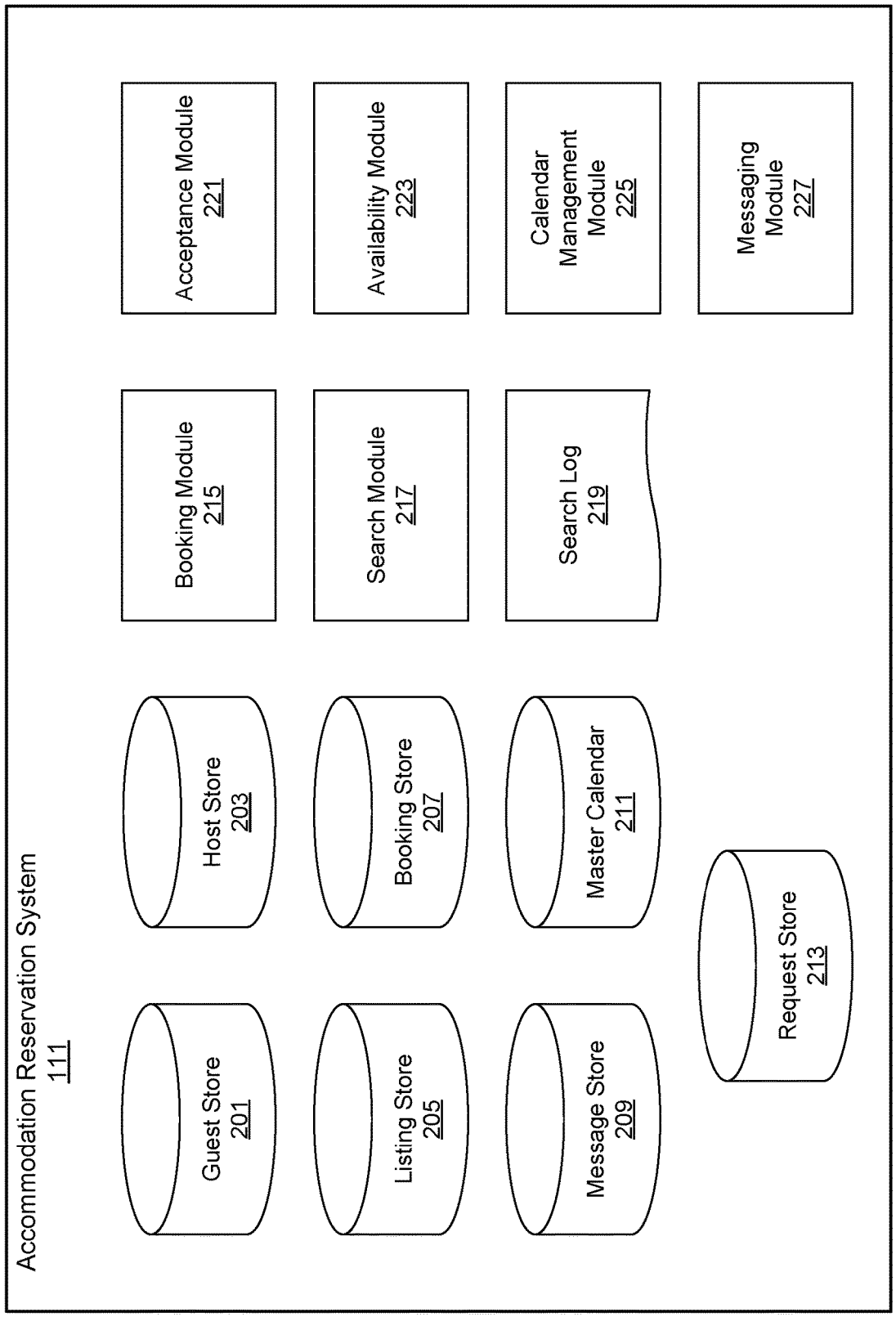
FIG. 2 is a block diagram illustrating the different modules inside the accommodation reservation system, in accordance with an embodiment of the invention.
Figure 3:
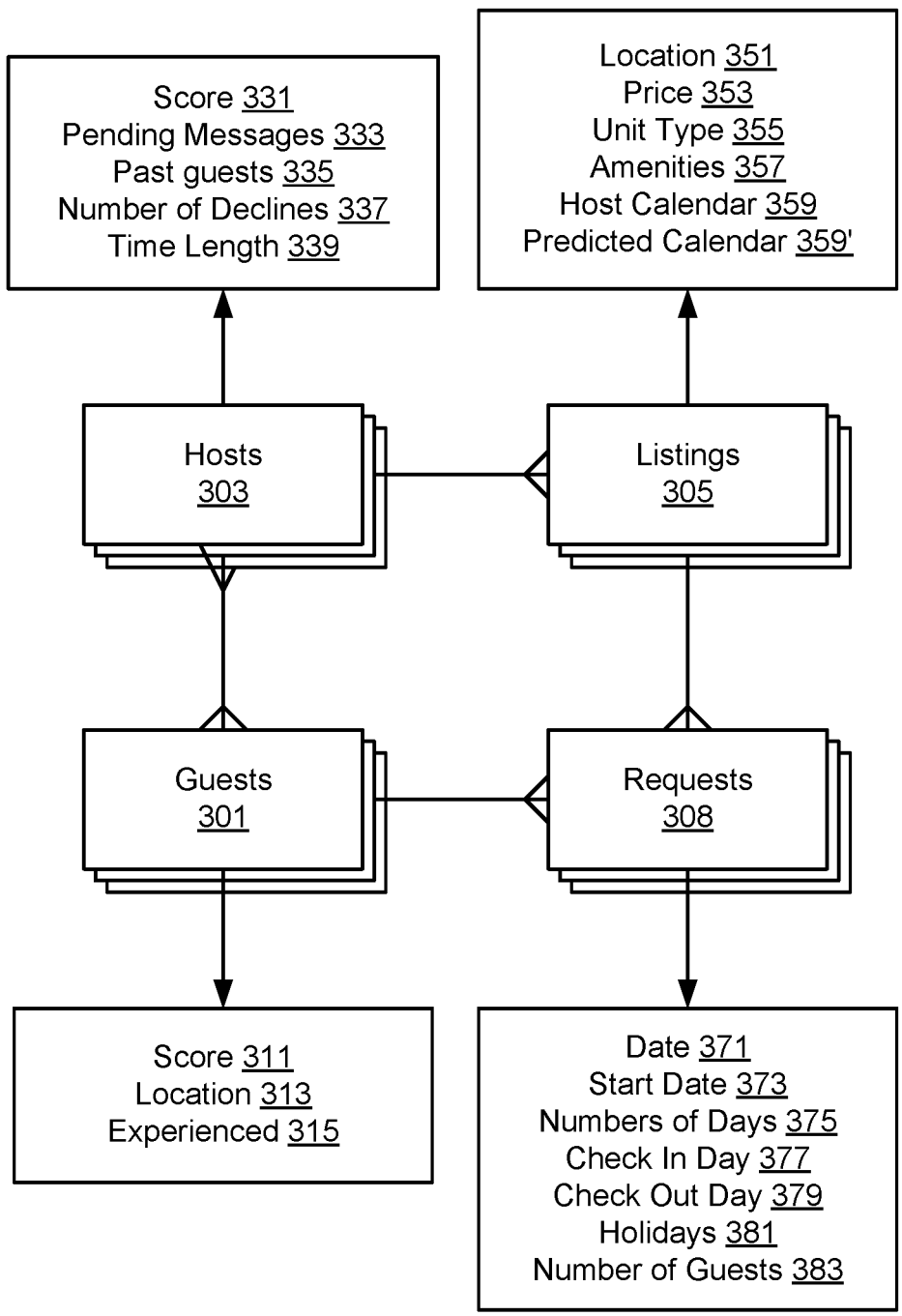
FIG. 3 is an illustration of the class diagram of the accommodation reservation system, in accordance with an embodiment of the invention.

Referring to FIG. 2 and FIG. 3, in one embodiment the accommodation reservation system 111 comprises a guest store 201, a host store 203, a listing store 205, request store 213, a booking store 207, a message store 209, a calendar 211, a booking module 215, a search module 217, a search log 219, an acceptance module 221, an availability module 223, a calendar management module 225, and a messaging module 227. Those of skill in the art will appreciate that the accommodation reservation system 111 may contain other modules that are not described herein. In addition, conventional elements, such as firewalls, authentication systems, payment processing systems, network management tools, load balancers, and so forth are not shown as they are not material to the invention. The system 111 may be implemented using a single computer, or a network of computers, including cloud-based computer implementations. The computers are preferably server class computers including one or more high-performance CPUs and 1G or more of main memory, and running an operating system such as LINUX or variants thereof. The operations of the system 111 as described herein can be controlled through either hardware or through computer programs installed in non-transitory computer storage and executed by the processors to perform the functions described herein. The various stores (e.g., guest store 201, host store 203, etc.) are implemented using non-transitory computer readable storage devices, and suitable database management systems for data access and retrieval. The system 100 includes other hardware elements necessary for the operations described here, including network interfaces and protocols, input devices for data entry, and output devices for display, printing, or other presentations of data.

The guest store 201 persistently stores data describing users that requested accommodation (i.e. guests) in the accommodation reservation system 111, and is one means for performing this function. Each guest is represented by guest object 301, which may also be called a guest profile. Information about guests include guest personal information such as name, user name, email address, location, phone number, gender, date of birth, personal description, education, work, reviews from other users, pictures, and the like. Moreover, guest store 201 may store additional information such as guest score 311 and experienced flag 315. Each guest is assigned a unique ID. The guest score 311 provides a numerical representation of the user's previous behavior as a guest. In some embodiments, the guest score is based on the scores assigned by hosts from the guest's previous bookings. The experienced flag 315 shows whether the guest is a frequent user of the accommodation reservation system 111, and can be based, for example, on the total number of times a guest has booked an accommodation through the accommodation reservation system 111, the number of times a guest has used the accommodation reservation system 111 in the recent past (e.g. number of accommodations a guest has booked in the past 60 days), the length of time the guest has used the reservation system 111, or a combination of thereof.

The host store 203 persistently stores data describing users that provided or are willing to provide accommodation to other users of the accommodation reservation system 111, and is one means for performing this function. Each host is represented by host object 303, which may also be called a host profile. Information about hosts include host personal information such as name, user name, email address, location, phone number, gender, date of birth, personal description, education, work, reviews from other users, pictures, and the like. Furthermore, the host store 203 may store additional information such as host score 331, pending messages 333, past guests 335, number of declines 337, and time length 339. Each host object 303 is associated with one or more listings 305, and with one or more guest objects 301. Each host is assigned a unique host ID.

The host score 331 provides a numerical representation the user's previous behavior as a host. The host score can be based on the rating assigned by guests from the host's previous bookings. Generally, each time a guest who books an accommodation from a host can provide a rating of the host as well as the accommodation. The ratings are then aggregated into a host score. The ratings can be weighted according to the guests' own scores 311, as well as decayed based on the age of the rating (i.e., how old the rating is).

The accommodation reservation system 111 enables, via the messaging module 227, guests and hosts to send messages to each other regarding accommodations. Pending messages 333 counts the number of messages from guests that the host has not responded to (i.e. number of messages waiting for a response). Pending messages 333 measures the responsiveness of a host to guests' inquiries.

Past guests 335 counts the number of guests the host has accommodated. One embodiment counts the total number of guests a host has accommodated since the host started using the accommodation reservation system 111. Another embodiment only considers the number of guests a host has accommodated in the recent past (e.g. in the past 30 days).

Number of declines 337 counts the number of times the host has rejected an accommodation request from a potential guest. A host may decline an accommodation request for any number of reasons. For example, a request from a guest may not have been for a minimum number of days; or the accommodation was not in fact available and the host did not updated the listing's calendar, as further described below.

Time length 339 measures the amount of time the host has been offering accommodation through the accommodation reservation system 111.

A host can also use the accommodation reservation system to request accommodation from other hosts, hence becoming a guest. In this case the user will have a profile entry in both the guest store 201 and the host store 203. Embodiments of the accommodation reservation system 111 may combine the guest store 201 and the host store 203 into a single user profile store. The user profile store will then store the personal information as well as any guest related information and host related information if applicable. This scheme reduces the amount of redundant information between the guest store 201 and the host store 203 when a user utilizes the accommodation reservation system to both offer accommodation and request accommodation.

The listing store 205 stores information about the accommodations offered by hosts, and is one means for performing this function. Each offering of a given accommodation is represented by listing object 305. Information about a listing includes the location 351, price 353, unit type 355, amenities 357, and calendar 359. The listing store 205 may contain additional information such as a short description of the accommodation, a list of house rules, photographs, etc. Each listing 305 is assigned a unique listing ID. Each listing 305 is associated with a single host object 303.

Location 351 identifies the geographic location of the accommodation, such as the complete address, neighborhood, city, and/or country of the accommodation offered.

Price 353 is the amount of money a guest needs to pay in order to obtain the listed accommodation. The price 353 may be specified as an amount of money per day, per week and/or per month, or other period of time specified by the host. Additionally price 353 may include additional charges such as cleaning fee, pet fee, and service fees.

Unit type 355 describes the type of accommodation being offered by the host. Embodiments classify unit type into two groups, room type and property type. Types of room include entire home or apartment, private room, and shared room. Types of property include apartment, house, bed & breakfast, cabin, villa, castle, dorm, treehouse, boat, plane, parking space, car, van, camper or recreational vehicle, igloo, lighthouse, yurt, tipi, cave, island, chalet, earth house, hut, train, tent, loft, and the like.

Amenities 357 list the additional features that an accommodation offers. Amenities include smoking allowed, pets allowed, TV, cable TV, internet, wireless internet, air conditioning, heating, elevator, handicap accessible, pool, kitchen, free parking on premise, doorman, gym, hot tub, indoor fireplace, buzzer or wireless intercom, breakfast, family or kid friendly, suitable for events, washer, drier, and the like.

In one embodiment, each listing 305 is associated with two types of calendars, a host calendar 359, and a predicted calendar 359', each of which stores information about the availability of the accommodation. The host calendar 359' stores the availability of the accommodation for each date in a date period, as specified by the host. That is, a host accesses the host calendar 359 for a listing, and manually indicates which dates that the listing is or is not available. The host specified calendar also includes information about the dates that the accommodation is unavailable because it has already been booked by a guest. Secondly, a predicted calendar 359' stores for each date in the date period, a probability that the accommodation is available, as determined by the availability module 223. The date period can be, for example, 60 or 180 days into the future. In addition, after the accommodation has been booked, the host calendar 359 continues to store historical information (e.g., for the past 180 days) as to the dates that accommodation was in fact booked or available.

The request store 213 stores accommodation request made by guests, and is one means for performing this function. Each request is represented by request object 307. Information stored about requests include request date 371, start date 373, number of days 375, day of the week for check in 377, day of the week for check out 379, holidays 381, and number of guests 383. Each request 307 is assigned a unique request ID. A given request 307 is associated with an individual guest 301 and listing 305.

Request date 371 specifies the date the request was made. Start date 373 is the first day accommodation is needed by the requesting guest. Number of days 375 specifies the number of days the accommodation is needed by the guest. Check in day 377 and check out day 379 specify the day of the week (i.e. Monday, Tuesday, Wednesday, etc) that check in or check out is required. This information does not need to be provided by the guest since it can be inferred from the start date 373 and the number of days 375. This information is important since some hosts only allow for check in and/or check out in specific days of the week (e.g. only on weekdays or only on weekends). Holidays 381 indicates the dates (if any) of holidays within the requested accommodation period. Number of guests 383 stipulates the total number of people that are staying in the accommodation.

In some embodiments, requests 307 can be accepted or rejected by the host 303 of the listing 305 the request 307 is associated with. Furthermore, requests 307 can also expire if they are not accepted by the host 303 of the listing 305 the request 307 is associated with within a threshold amount of time. In some embodiments the expiration time of requests 307 is set by the accommodation reservation system 111 (e.g., requests 307 expire if they are not accepted within 24 hours since the time the request 307 was submitted). In other embodiments the expiration time of requests 307 can be specified by the host 303. In yet other embodiments, requests 307 may expire if they are not accepted a threshold amount of time prior to the date 373 the accommodation was requested for (e.g., requests 307 may expire if they are not accepted two days before the day the start date 373).

The message store 209 stores all the communications between hosts 103 and guests 101, as exchanged via the messages module 227, and is one means for performing this function. Each message is associated with a guest 101, a host 103 and a listing 107. Guest may contact one or more hosts to obtain more information about their respective listings. Some guests may also use messages as a means to obtain more information about the hosts and vise versa.

Additionally, the accommodation reservation system may assign scores to hosts and guests based on their responsiveness to incoming messages. Every host and guest may be assigned a response rate score based on the percentage of messages they reply to. Also users may be assigned a response time score based on the time average time it takes for them to respond to incoming messages.

The master calendar 211 stores information indicating the availability of every listing in the listings store 205, and is one means for performing this function. Each host is responsible for updating the listing calendar 359 for every listing they post in the accommodation reservation system 111. This information is used to form the master calendar 211. In some embodiments, the accommodation reservation system also includes a predicted calendar that stores a probability that the accommodation is going to be available. In one embodiment, the calendar 211 and the predicted calendar are combined into a single calendar that stores a probability of 0 for dates that explicitly marked as unavailable by the host and a probability greater than 0 (and less than or equal to 1) for dates that are unavailable as unavailable by the host. In another embodiment a negative value can be stored for days explicitly marked as unavailable by the host.

The booking module 215 allows guests 101 reserve an accommodation offered, and is one means for performing this function. The booking module 215 updates the booking store 207 and instructs the calendar management module 225 to flag the booked days for the listing as unavailable upon a host accepting a guest's accommodation request. The booking store 207 stores information about all the reservations accepted accommodation requests. Each entry in the booking store 207 is associated with a host, a guest and a listing. An entry is the booking store 207 is made by the booking module once a host accepts a guest's request for a listing.

The search module 217 receives an input query from a guest and returns a list of accommodation listings that best match the input query, and is one means for performing this function. The search query includes search parameters regarding the guest's trip, such as location (e.g., postal code, city name, country), check in date, check out date, number of guests, and the like; and the guest's accommodations preferences, such as room type, price range, amenities, and the like. The search module then retrieves all the listing that match the search query. In one embodiment, Boolean matching is used for parameters such as location and date, room type and price range, with additional parameters used to further filter the results.

In some embodiments the search module 217 ranks the returned search results based on a ranking score. The ranking score is a function of a number of factors, such as price, host rating, distance from preferred location, listing, or a combination thereof. The ranking function can be implemented as a linear combination of the individual factors, where each factor is represented as a scaled variable indicating a degree of match (e.g., 1 of an exact match of the underlying search parameter, 0.5 for a partial or near match), and weighted with a weight to reflect the importance of the factor. Typically, location and date are highly weighted, and amenities are lesser weighted, but the particular weights are a design decision for the system administrator. In one embodiment, the ranking factors include information provided by the availability module 223 and the acceptance module 221.

The search log 219 keeps a record of all search queries performed in the accommodation reservation system 111, and is one means for performing this function. Embodiments maintain the information in a database or other type of data repository. Every search query is associated with a guest and includes information about the search parameters and the set of listing obtained by the search module that match the query. Some embodiments of the search log 219 also store information regarding the actions taken by the guest after receiving the list of possible accommodations. For example, the search log may maintain information about which listings the user clicked or viewed, and which listing the guest requested accommodation to.

The availability module 223 calculates the probability of availability (PA) for a given listing for a given date or date period, and is one means for performing this function. Embodiments of the availability module 223 use a machine learned, predictive model. In one embodiment, a supervised machine learning algorithm, such as support vector machine is used to construct the predictive model. In other embodiments, other machine learning algorithms, such as neural network, random forest or any other supervised learning algorithms may be used to build the predictive model. On periodic basis (e.g., once a day) the availability module 223 calculates the probability of availability of each current listing 305 for some number of days going forward, and updates that listing's predicted calendar 359'. For example, assuming the predicted calendar 359' for a listing 305 spans 180 days into the future, the availability module 223 determines, each such future date, the probability that the listing 305 will be available, and stores this value in the predicted calendar 359' for the listing 305. This predicted availability information can be used by the search module 217 as a ranking factor when ranking listings in response to a search query. Generally, the search module 217 ranks more highly listings that have a high probability of being available during a requested period, and ranks more lowly listings that have a low probability of being available. Some embodiments only use the information provided by the availability module as a ranking factor only if the guest requests it. Other embodiments use the information provided by the availability module by default unless specified otherwise by the guest. In one embodiment, the accommodation reservation system 111 designates an accommodation are unavailable if the probability of availability is below a predetermined threshold. Other embodiments allow users to specify their own threshold. The construction of the availability model is further described below.

The acceptance module 221 calculates the probability of acceptance (PC) of an accommodation request by a particular guest for a particular listing by the host, and is one means for performing this function. Embodiments of the acceptance module 221 use an acceptance model for each host, based on requests for listings that the host has accepted and rejected historically. When a guest searches for listings in a certain location, the acceptance module 221 calculates the probability that if a request for a given listing is made by that guest, the host will accept that request. The search module 217 can use the probability of acceptance as a ranking factor, when ranking the search results or to filter listings with a probability of acceptance lower than a threshold score. Generally, the search module 217 ranks more highly listings that have a high probability of being accepted by the host, and ranks more lowly listings that have a low probability of being accepted.

The calendar management module 225 updates the calendars 359 for every listing based on the information provided by the hosts and the booking module 215, and is one means for performing this function. Some embodiments also update the calendars for every listing based on the information provided by the availability module 223. In one embodiment the calendar management module 225 determines whether to update the host calendar 359 for a listing 305 based on the availability module 223 depending on the frequency the host updates the host calendars 359. On one hand, if the host 103 updates his calendars frequently (e.g., the average amount of time between updates is below a threshold), then the information available to the accommodation reservation system 111 is most likely to be up to date. On the other hand, if the host 103 does not update his calendars frequently, then the information available to the accommodation reservation system 111 is most likely out dated and the availability module can estimate the real availability of a listed accommodation based on the host's availability history.

Availability Model

The availability module 223 generates and uses an availability model to estimate the probability that an accommodation is available on a requested date. In one embodiment, the module 223 creates an availability model each host offering accommodations. A host specific model can model the specific behavior of a host, and is useful where a host has a sufficient history of offering accommodations. In other embodiments, the module 223 creates a global or regional model to capture the behavior of most hosts within a geographical region (e.g. nationwide, statewide, citywide, etc). Regional models are useful to model the overall behavior of hosts within a given area, and reflect regional customs and practices, such as when local holidays and festivals tend to make hosts more or less likely to have accommodations available to guests. Regional models are also useful to provide a default model for a host for which there is insufficient historical information with which to create a host specific model.

The availability model is trained on a set of training data extracted from past requests 308 over some time period. The time period can cover all historical request, or only a limited period of time (e.g. on the past six months). For a host specific model, the training set is just requests 308 made for that host's listings. For a regional model, the training set is requests 308 for all listings 305 in the geographic area of the region (using the location 351 of each listing).

For every listing, for a specific date in the time period, the availability model considers all the requests for accommodations made on that date. For each request, the model determines whether the accommodation was available or unavailable, based on whether the request was accepted by the host.

If, for a given request on a given date, the host accepted the request, then the availability model determines that the accommodation was available with a probability of 1 (i.e. the accommodation was unavailable with a probability of 0). For accepted requests that spans over several days, the availability module determines that every day included in the request was available with a probability of 1.

If, for a certain date, no requests were made, the availability model would not have any data or information to train on. In this case, the availability model would not be able to provide an accurate estimate of the probability that the accommodation was available. Some embodiments assign a probability of availability of 0.5 (i.e. the accommodation was unavailable with a probability of 0.5) for dates with no requests. Other embodiments assign other probability values provided that the host did not explicitly mark the date as unavailable.

If, for a certain date, all requests are either rejected or expired, the availability module can calculate a probability that the accommodation was unavailable. In some embodiments, if all requests are rejected, the availability module assigns a probability of availability of 0. In other embodiments, a threshold number of requests need to be rejected in order for the availability model to determine that the accommodation was unavailable for that date. In other embodiments, a probability that the accommodation is unavailable is determined based on the number of rejected and expired requests.

In some embodiments, the availability module 223 uses the responses to messages that a host 303 sends to a guest 301 to train the availability model. Oftentimes, before a guest 301 submits a request for accommodations, the guest 301 may send a message to hosts 303 to ask for more details about their listings and to confirm that the desired dates are available. Hosts 303 may replay the message indicating whether the dates are available and the guest 301 may not submit a request for accommodation if the host 303 indicates that any of the dates is unavailable. This may reduce the training set of the availability model. The messages sent by a host 303 can be analyzed to determine if they contain any indication that any day that a guest 301 asked for is unavailable. In some embodiments, if there is an indication in a message from a host 303 that an accommodation is unavailable, the availability module considers the host's inquiry as a rejected request.

Embodiments of the availability model can also construct a model for different days of the week, months and/or holidays. For example, the availability model can determine that every Saturday has a certain probability of availability based on the ratio between the number of accepted requests for accommodation on a Saturday and the number of rejected or expired requests for accommodation on a Saturday. Similarly, the availability model can determine a probability of availability for a day in December based on all the requests for accommodation on a day in December in previous years.

Embodiments can also determine a probability of availability based on the proximity of the date the request was made to the date the accommodation is requested for. For example, a host may only provide accommodation if the request was made at least 2 days in advanced. The availability model can determine the probability that the accommodation is available "n" days in the future based on all the previous requests that were made "n" days in advance to the date the accommodation was requested for.

Embodiments develop a model that takes into account some or all the aforementioned criteria to predict the availability of an accommodation. The different criteria (i.e., day of the week, month, number of days in advance, etc) can be used to determine independent probabilities that can be later combined by multiplying them. In other embodiments, a single probability that takes into account every criterion is determined.

In one embodiment, the availability module create a probability function that takes as input one or more characteristics of the date (e.g. day of the week, month, whether it is a holiday, proximity to current date, etc) and generates a value that measures the likelihood that the accommodation is going to be available. For example, the availability module can create a probability function that calculates the likelihood that the accommodation is going to be available depending on the day of the week (P(available|day_of_the_week)). The availability module can also create a probability function that calculates the likelihood that the accommodation is going to be available depending on which month the date is in (P(available|month)). Similar functions can be created for other characteristics of the date (e.g., P(available|holiday), P(available|proximity_to_current_date), etc).

After the availability module has constructed the availability model, it can be used to calculate the availability of an accommodation for day in the future. The availability module can compute the different probabilities associated with a given date and determine an overall probability as:

$$PA = P(available|day\_of\_the\_week) \times P(available|month) \times P(available|holiday) \times P(available|proximity\_to\_date) \times K$$

For example, if the availability module is calculating the probability of availability for Feb. 14, 2014, it can use the previously analyzed historical information to determine whether a given listing is going to be available during that date. For instance Feb. 14, 2014 is a Friday. From the historical data, the availability module can determine what the probability of availability is for that listing given that the date is a Friday. Also, the availability module can determine what the availability is for that listing for a day in February. Furthermore. Feb. 14, 2014 is Valentine's day. Therefore, from historical information, the availability module can determine what the availability of the listing is given that the day is Valentine's day. Additionally the availability module can determine the probability of availability of the accommodation based on the number of days left until Feb. 14, 2014. Then, the availability module can combine those probabilities and generate an aggregate probability that takes into account all the previously mentioned factors. Therefore, the probability of availability for the accommodation will be $$PA = P(available|Friday) \times P(available|February) \times P(available|Valentine's\_day) \times P(available|proximity\_to\_date)$$

The availability model beneficially allows the accommodation reservation system to filter the results of an accommodation search query or to sort the results of the same. If an unfiltered and/or unsorted search result is presented to a guest, the guest will spend time reviewing available listings as well as unavailable listing. Furthermore, hosts may get messages from guests requesting accommodation for unavailable days. Thus it would be more productive and convenient for both guests and hosts if the search results given to guests are filtered and/or sorted according to availability.

Acceptance Model

The acceptance module 221 creates and uses an acceptance model to estimate the probability that a host is going to accept a request for accommodation made by a guest. Embodiments of the acceptance model train on past requests made on dates with a probability of availability higher than a threshold value.

Embodiments of the acceptance model can take into account information about the guest (e.g., gender, guest score 311, guest location 313, and/or guest experience flag 315); information about the host; information about the request (e.g., start date 373, number of days 375, check in day 377, check out day 379, and/or number of guests 383); information about messages sent by the guest to the host (e.g., the language of the message); information about the listing (e.g., maximum number of guests, the rate of denials, and/or the number of congruent inquiries); and/or information about the market (e.g., market occupancy, and/or market demand).

The accommodation reservation system 111 may obtain information about the market by analyzing the status of accommodations in a particular geographical location. For example, to determine the market occupancy, the accommodation reservation system 111 may determine the percentage of listings 305 that are booked for a particular day. Additionally, to determine the market demand, the accommodation reservation system 111 may determine the number of guests 301 that have requested for accommodation in a particular period of time (e.g. the market demand for February 2013 may be determined by counting the number of guest 301 that requested for accommodation in the month of February in the year 2013). In one embodiment, the market occupancy is determined by the number of guests 301 that searched for listings in a particular geographic location on a specific period of time (e.g. number of guests 301 that searched for listings in the Rome in February, 2013).

Embodiments develop an acceptance model for every host offering accommodation through the accommodation reservation system 111. Other embodiments develop an acceptance model for every listing in the accommodation reservation system 111.

In some embodiments, to develop the acceptance model for a given listing, the acceptance module 221 computes all the training parameters from every request made on available days and determines whether the request was accepted or rejected. In one embodiment, a probability function is constructed for every training parameter and an overall probability of acceptance is computed by multiplying the individual probabilities.

For example, the acceptance module 221 may create a probability function that calculates the likelihood that a host 303 will accept a request for accommodation depending on the gender of the guest 301 (e.g., P(accept|guest_is_male), P(accept|guest_is_female) or P(accept|guest_gender_is_unknown)). The acceptance module 221 may also create a probability function that a host 303 will accept a request depending on other guest parameters (e.g., P(accept|guest_location), P(accept|guest_score), P(accept|guest_experience), etc.). Furthermore, the acceptance module 221 may also create probability functions based on request parameters (e.g., P(accept|start_date), P(accept|number_of_days), P(accept|check_in_day), P(accept|check_out_day), P(accept|number_of_guest), etc.), message parameters (e.g., P(accept|message_language)), information about the listing (e.g., P(accept|rate_of_denials), P(accept|number_of_congruent_inquiries), etc.), information about the market (e.g., P(accept|market_occupancy), P(accept|market_demand), etc.), and the like.

After the acceptance module 221 has constructed the acceptance model, it can be used to calculate the probability that a host will accept a request for accommodation. The acceptance module can compute the different probabilities associated with a given request and determine an overall probability as:

$$PA = P(\text{accep tan ce}|gender) \times P(\text{accep tan ce}|guest\_location) \times K \times P(\text{accep tan ce}|start\_date) \times P(\text{accep tan ce}|number\_of\_days) \times K \times P(\text{accep tan ce}|message\_language) \times P(\text{accep tan ce}|rate\_of\_denials) \times K \times$$

For example, if a male guest that lives in the United States requests for a particular accommodation in London, starting on Mar. 15, 2013 and ending on Mar. 17, 2013, the acceptance module 221 can determine the probability that such request will be accepted. The acceptance module can calculate the individual probabilities based on the information available and combine them to estimate the overall likelihood that the request will be accepted $$PA = P(\text{accep tan ce}|guest\_is\_male) \times P(\text{accep tan ce}|guest\_from\_US) \times K \times P(\text{accep tan ce}|start: 03/15/2013) \times P(\text{accep tan ce}|3\_days) \times K$$

In one embodiment the acceptance module 221 updates the acceptance model periodically (e.g., every night). In some embodiments, the acceptance module 221 only generates an acceptance model for hosts that have been offering accommodation through the accommodation reservation system 111 for at least a threshold amount of time (e.g., hosts that have been offering accommodation for at least 3 months), or for host that have at least a threshold number of request (e.g., hosts that have at least 50 requests for accommodation through the accommodation reservation system 111).

The acceptance module beneficially allows the accommodation reservation system 111 to filter results of an accommodation search query or to sort the results of the same. For example, the accommodation reservation system 111 may have determined that a particular host does not accept request for accommodation from hosts from other countries. Therefore, listings from this host can be filtered out from search results from guests from foreign countries.

Scoring

Upon receiving a search query comprising a geographical location and a date range, the accommodation reservation system 111 computes the probability of booking for accommodations that match the search query. In some embodiments, the probability that the accommodation is going to be available is computed and the accommodation further processed only if the probability is higher than a threshold. For each accommodation that matches the search query, the availability module 223 retrieves, for each requested date, the probability that the accommodation is available and computes the aggregate probability by multiplying the probabilities for each date.

$$PA = \prod_{i=1}^{n} P(\text{available@}\,i)$$

where P(available@1) is the probability that the accommodation is available the first requested date and P(available@n) is the probability that the accommodation is available the last requested date.

After the availability module 223 has determined that the probability that the accommodation is going to be available is higher than a threshold, the acceptance module 221 computes the probability (PC) that the host associated with the accommodation is going to accept a request made for the dates specified in the search query. Then the accommodation reservation system can compute a probability that the guest will be able to book the accommodation (PB) by multiplying the probability that the accommodation is available and the probability that the host is going to accept the request $$PB = PA \times PC$$

In some embodiments, the probability of booking (PB) is used to rank the accommodations before presenting the search results to the guest. In other embodiments, other metrics, such as the quality score of the accommodation, the host rating, etc, in addition to the probability of booking can be used to rank the accommodations before presenting the search results to the guest.

Figure 4:
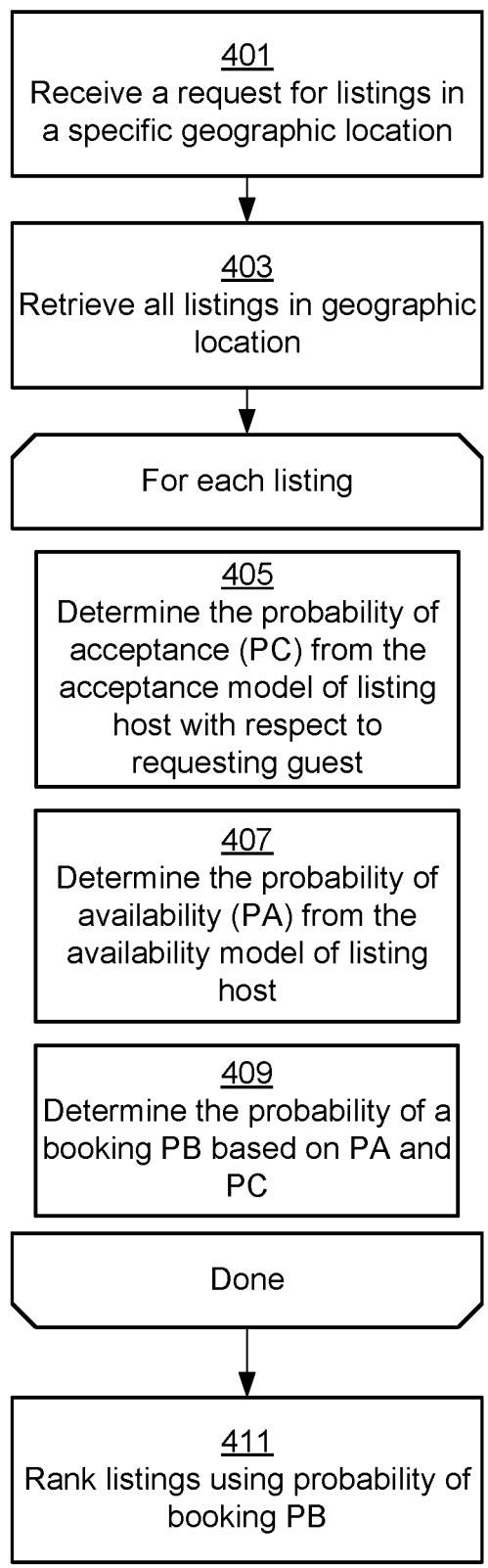
FIG. 4 is a flowchart of an exemplary method for updating the calendar information of the accommodation reservation system, in accordance with one embodiment of the invention.

FIG. 4 shows a flowchart of a process for updating the calendar information of the accommodation reservation system, in accordance with an embodiment of the invention. The accommodation reservation system 111 receives 401 a request for listings in a specific geographic location. Based on the received request, the accommodation reservation system 111 retrieves 403 all listings in that are in the requested geographical location. For each retrieved listing, the acceptance module 221 determines 405 the probability of acceptance (PC) from the acceptance model of listing host with respect to the requesting guest. Also for each retrieved listing, the availability module 223 determines 407 the probability of availability (PA) from the availability model of the listing host. Then based on the probability of availability (PA) and the probability of acceptance (PC), the accommodation reservation system determines the probability of booking (PB). Finally listings are ranked 411 based on their probability of booking (PB).

Figure 5:
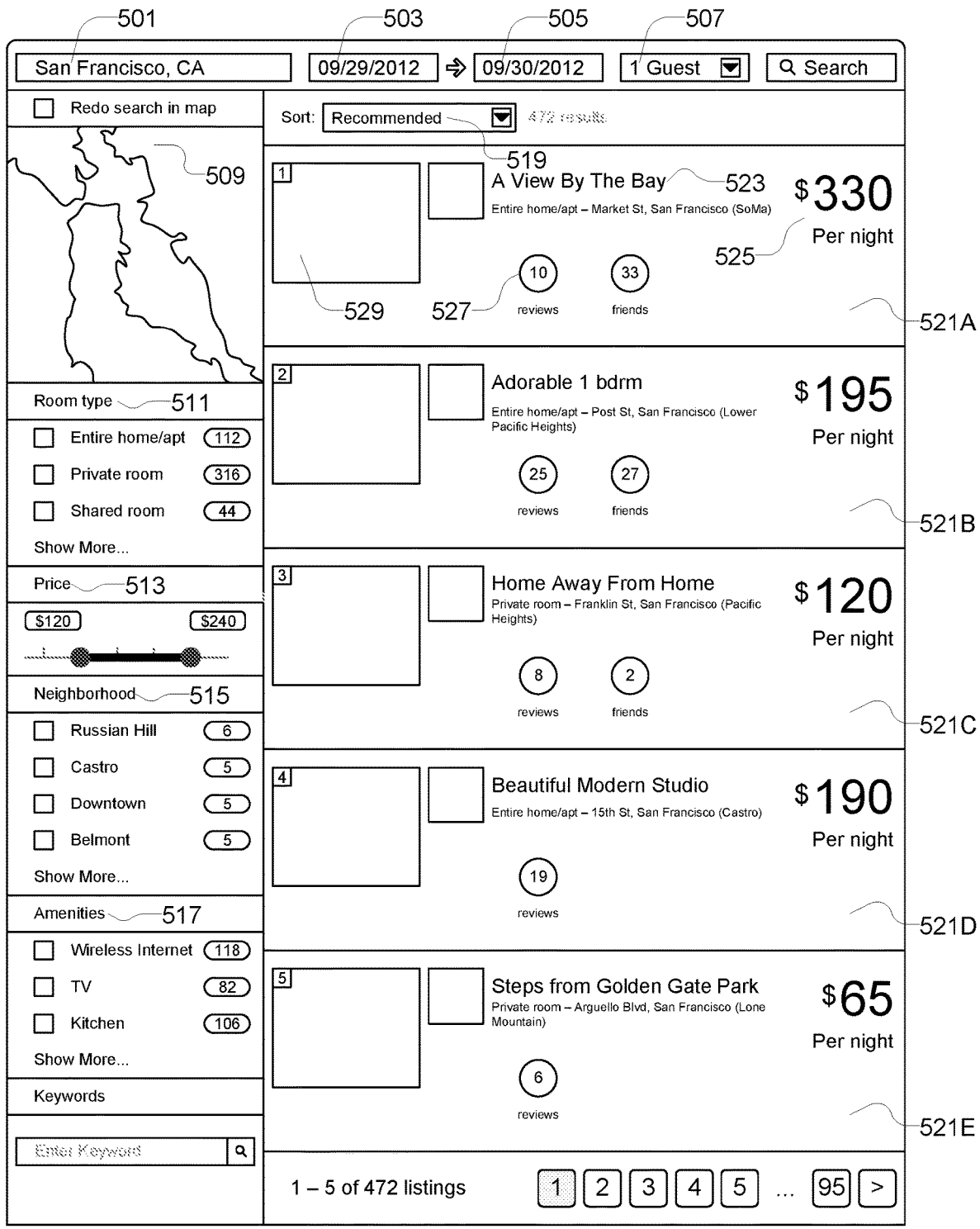
FIG. 5 is an exemplary user interface for searching available accommodation in an accommodation reservation system.

FIG. 5 shows an exemplary embodiment of the user interface for a guest to enter a search query and review the search results provided by the search module 217. The exemplary user interface includes means for a guest to enter a search query. The most important parameter is the location, which is entered in the location textbox 501. Embodiments only treat the location as a required parameter and treat other parameters (such as check in, check out, etc) as optional. The location can be specified in the location textbox 501. For example, the guest has entered the location "San Francisco, Calif." in the textbox 501. As a result the search module retrieves all the listings near San Francisco, Calif. In addition, the guest has specified the check in date to be Sep. 29, 2012 in textbox 503, the check out date to be Sep. 30, 2012 in textbox 505 and that there is only going to be 1 guest in the dropdown list 507.

The search module 217 filters the search results based on the specified parameters and displays the top results 521A through 521E. Each displayed search result consists of a listing title 523, a listing price 525, the number of reviews 527 and a picture 529. The criteria used to rank and sort the search results can be selected in the dropdown list 519. Available criteria to rank and sort the search results include recommended (i.e. the accommodation reservation system determines which is the most suitable listing for the guest based on the availability model and the acceptance model), distance, price: low to high, price: high to low, and newest (i.e. amount of time since the listing has been posted).

In addition, the guest can specify other parameters in the search query such as room type 511, price range 513, neighborhood 515, and amenities 517. The guest can also point a specific location in the map 509 to refine the location being searched.

Figure 6:
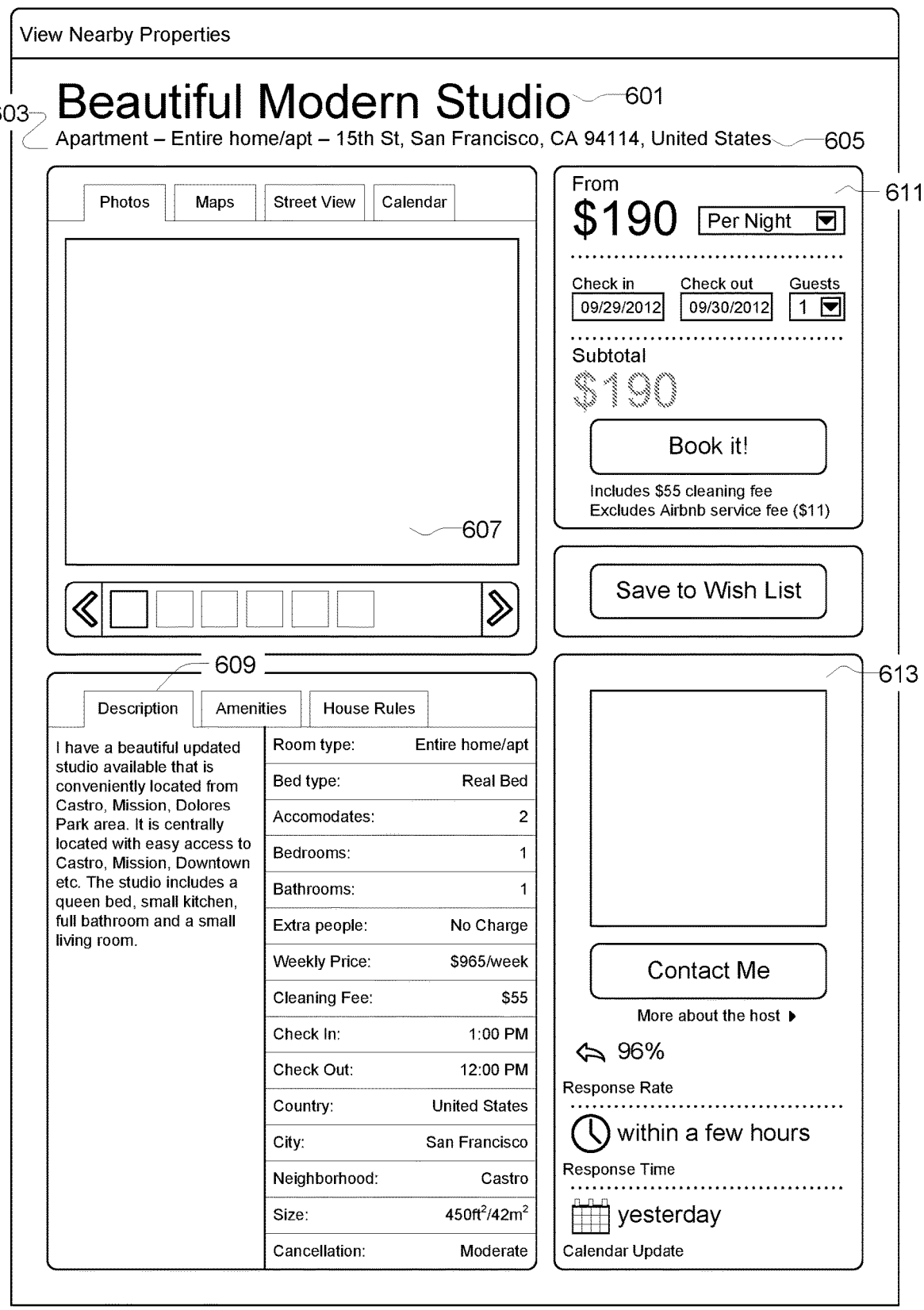
FIG. 6 is an exemplary user interface for viewing details of accommodation listing in an accommodation reservation system.

FIG. 6 is an exemplary embodiment of a page description for a listing in the accommodation reservation system 111. The description page includes additional information, not available in the search result page. In the description page, a guest can identify a list of pictures 607 of the property, a detail description 609 provided by the listing host, the price 611 per night as well as the total price for the entire trip, and the listing host's information 613.

The list of pictures 607 provides interested guests an idea of how the interior, the exterior and surroundings of the listed accommodation looks like. In one embodiment the pictures are provided by the listing hosts. In another embodiment, the accommodation reservation system provides a professional photographer to take pictures of the interior, exterior and surroundings of the listed property.

Detail description 609 provides with most of the information a guest requires to decide whether listed property meets the guest's needs. Detail description 609 includes a short pitch paragraph, a list of amenities, and a list of house rules. In some embodiments the accommodation reservation system verifies the veracity of the information provided in the detailed description. Other embodiments allow past guests to verify the accuracy of the detailed description via guest feedbacks or comments.

The price 611 shows the guest the unit price (i.e. the price per night, per week and/or per month). Also the accommodation reservation system 111 calculates the total cost of the accommodation based at least on the price per night, the check in date, check out date, number of guests, cleaning fees, service fees, and the like. Moreover, embodiments provide a "book it" button that allows guest to request the accommodation and pay for it after the host has accepted the request.

Host information 613 includes relevant facts about the listing host. Information provided includes response rate, response time, and/or calendar update frequency. Embodiments may also include a picture of the host and/or a short paragraph describing the host. Some embodiments also include a "contact me" button that allows a guest to communicate with the listing host.

Figure 7:
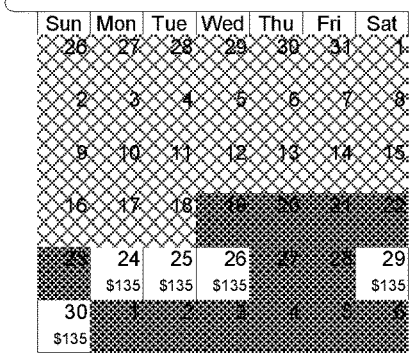
FIG. 7 is an exemplary user interface for viewing the availability of listed accommodation in an accommodation reservation system.

FIG. 7 is an exemplary embodiment of a page showing a calendar with the availability of an accommodation listed in the accommodation reservation system 111. Days in the calendar 701 can be marked as available, unavailable or past. In some embodiments guest can only request for accommodation on days marked as available. In other embodiments guests are allowed to request accommodation for unavailable days and the host can decide whether or not to accept the accommodation request based on the true availability of the listing.

In some embodiments the availability of only a predetermined number of days (e.g. 30 days) is shown in the calendar. In other embodiments, the accommodation reservation system allows the listing host to decide how many days in advance a reservation can be made. Embodiments also allow hosts to specify different prices for different days. For example, a host may assign a slightly higher price for weekends and holidays.

Figure 8:
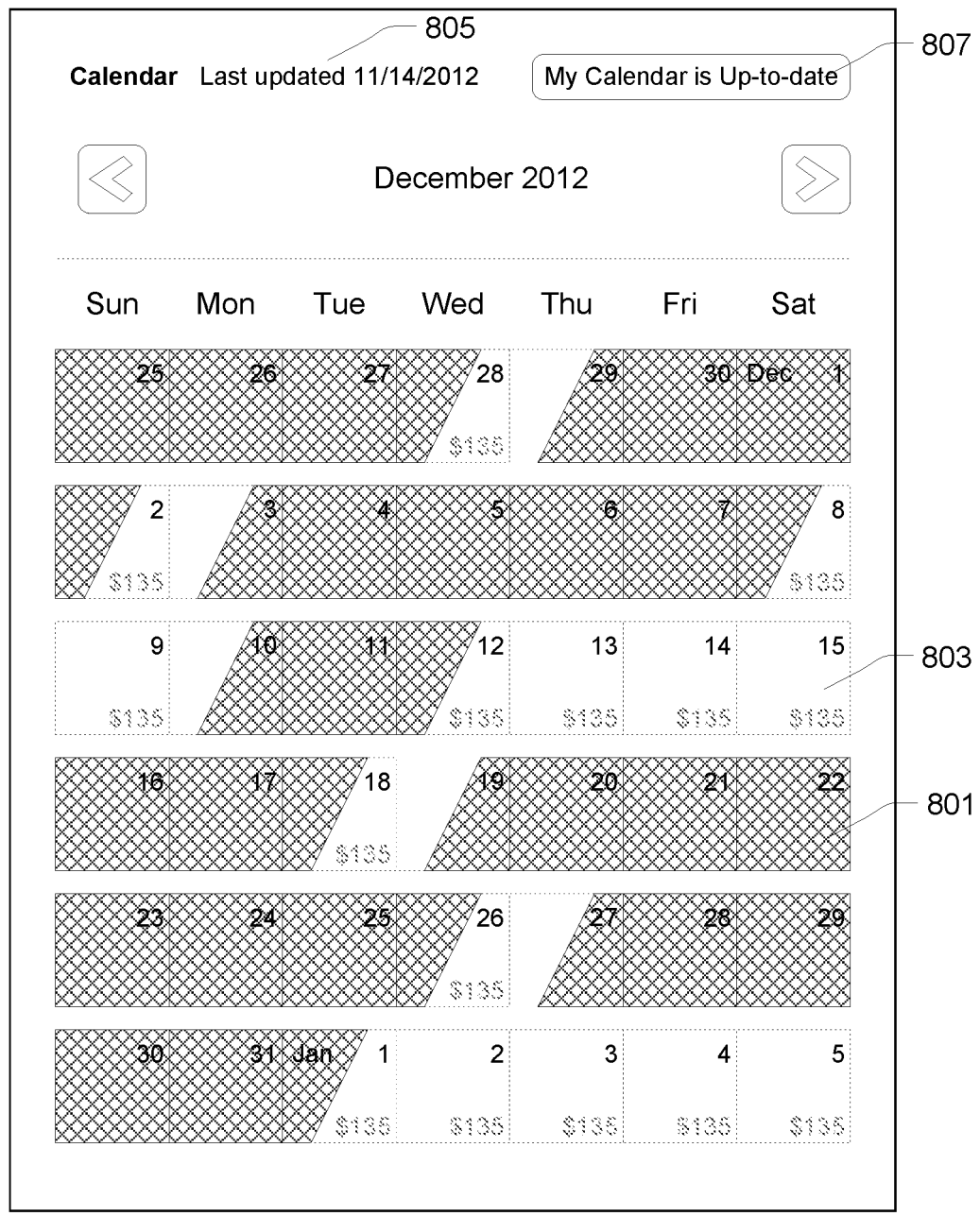
FIG. 8 is an exemplary user interface for updating the calendar information of listed accommodation in an accommodation reservation system.

FIG. 8 is an exemplary embodiment of a user interface for updating the availability of an accommodation listed in the accommodation reservation system 111. A host can mark days as unavailable 801 or available 803. The interface can also include a date field 805 indicating the date the calendar was last updated and a button 807 for the host to indicate that he has finished updating the calendar. In one embodiment, a host can only specify which dates are unavailable and every other date is consider by the accommodation reservation system as potentially available. In other embodiments, the host needs to explicitly indicate that a date is available. In one embodiment, this interface may also provide information to the host about the calculated probability of availability.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method, comprising:
   identifying a plurality of past booking requests for accommodations listed by hosts on a reservation platform, each of the plurality of past booking requests having one or more temporal features;
   receiving a search query from a guest for accommodation, the search query comprising a geographical location and a requested date range;
   identifying a set of candidate accommodations in the geographical location that are not booked during the requested date range, each of the candidate accommodations associated with an availability calendar that is maintained by a host of the candidate accommodation and indicates that the candidate accommodation is not booked during the requested date range;
   providing a user interface to the guest comprising identifiers of the set of candidate accommodations, the identifiers being sorted according to one or more default criteria;
   detecting a selection by the guest of an option to re-sort the identifiers according to an availability criterion;
   calculating, by applying a predictive computer model to the requested date range, a predicted availability that indicates a likelihood that each candidate accommodation of the set of candidate accommodations that is not booked during the requested date range according to the availability calendar is actually available for booking during the requested date range, the predictive computer model trained prior to receiving the search query based on values of a plurality of features of the past booking requests, the values at least partially relating to the one or more temporal features of each of the plurality of features;
   ranking the set of candidate accommodations based at least on their respective predicted availabilities; and
   updating the user interface to provide, to the guest, the identifiers as re-sorted according to the ranking.

2. The computer implemented method of claim 1, wherein the past booking requests were made for a number of days in the past.

3. The computer implemented method of claim 1, wherein the past booking requests were made at most a threshold number of days in the past.

4. The computer implemented method of claim 1, wherein calculating the predicted availability is based on a day of a week for which the accommodation is requested.

5. The computer implemented method of claim 1, wherein calculating the predicted availability is based on a month the accommodation is requested for.

6. The computer implemented method of claim 1, wherein calculating the predicted availability is based on whether a day the accommodation was requested for is a holiday.

7. The computer-implemented method of claim 1, further comprising, for each of the candidate accommodations, determining a probability of booking acceptance that indicates a likelihood that a booking request for the candidate accommodation will be accepted by the host of the accommodation in response to a booking request received from the guest, the probability of booking acceptance for the candidate accommodation being based upon the predicted availability for that candidate accommodation.

8. A system comprising:
   a non-transitory computer-readable medium with instructions encoded thereon; and
   one or more processors configured to, when executing the instructions, perform operations of:
   identifying a plurality of past booking requests for accommodations listed by hosts on a reservation platform, each of the plurality of past booking requests having one or more temporal features;
   receiving a search query from a guest for accommodation, the search query comprising a geographical location and a requested date range;
   identifying a set of candidate accommodations in the geographical location that are not booked during the requested date range, each of the candidate accommodations associated with an availability calendar that is maintained by a host of the candidate accommodation and indicates that the candidate accommodation is not booked during the requested date range;
   providing a user interface to the guest comprising identifiers of the set of candidate accommodations, the identifiers being sorted according to one or more default criteria;
   detecting a selection by the guest of an option to re-sort the identifiers according to an availability criterion;
   calculating, by applying the predictive computer model to the requested date range, a predicted availability that indicates a likelihood that each candidate accommodation of the set of candidate accommodations that is not booked during the requested date range according to the availability calendar is actually available for booking during the requested date range, the predictive computer model trained prior to receiving the search query based on values of a plurality of features of the past booking requests, the values at least partially relating to the one or more temporal features of each of the plurality of features;
   ranking the set of candidate accommodations based at least on their respective predicted availabilities; and
   updating the user interface to provide, to the guest, the identifiers as re-sorted according to the ranking.

9. The system of claim 8, wherein the past booking requests were made for a number of days in the past.

10. The system of claim 8, wherein the past booking requests were made at most a threshold number of days in the past.

11. The system of claim 8, wherein calculating the predicted availability is based on a day of a week for which the accommodation is requested.

12. The system of claim 8, wherein calculating the predicted availability is based on a month the accommodation is requested for.

13. The system of claim 8, wherein calculating the predicted availability is based on whether a day the accommodation was requested for is a holiday.

14. The system of claim 8, wherein the one or more processors is further configured, when executing the instructions to perform operations of, for each of the candidate accommodations, determining a probability of booking acceptance that indicates a likelihood that a booking request for the candidate accommodation will be accepted by the host of the accommodation in response to a booking request received from the guest, the probability of booking acceptance for the candidate accommodation being based upon the predicted availability for that candidate accommodation.

15. A computer program product comprising a non-transitory computer-readable storage medium containing computer program code, the computer program code when executed by one or more processors causes the one or more processors to perform operations, the computer program code comprising instructions to:

identify a plurality of past booking requests for accommodations listed by hosts on a reservation platform, each of the plurality of past booking requests having one or more temporal features;

receive a search query from a guest for accommodation, the search query comprising a geographical location and a requested date range;

identify a set of candidate accommodations in the geographical location that are not booked during the requested date range, each of the candidate accommodations associated with an availability calendar that is maintained by a host of the candidate accommodation and indicates that the candidate accommodation is not booked during the requested date range;

provide a user interface to the guest comprising identifiers of the set of candidate accommodations, the identifiers being sorted according to one or more default criteria;

detect a selection by the guest of an option to re-sort the identifiers according to an availability criterion;

calculate, by applying the predictive computer model to the requested date range, a predicted availability that indicates a likelihood that each candidate accommodation of the set of candidate accommodations that is not booked during the requested date range according to the availability calendar is actually available for booking during the requested date range, the predictive computer model trained prior to receiving the search query based on values of a plurality of features of the past booking requests, the values at least partially relating to the one or more temporal features of each of the plurality of features;

rank the set of candidate accommodations based at least on their respective predicted availabilities; and update the user interface to provide, to the guest, the identifiers as re-sorted according to the ranking.

16. The computer program product of claim 15, wherein the past booking requests were made for a number of days in the past.

17. The computer program product of claim 15, wherein the past booking requests were made at most a threshold number of days in the past.

18. The computer program product of claim 15, wherein calculating the predicted availability is based on a day of a week for which the accommodation is requested.

19. The computer program product of claim 15, wherein calculating the predicted availability is based on a month the accommodation is requested for.

20. The computer program product of claim 15, wherein calculating the predicted availability is based on whether a day the accommodation was requested for is a holiday.

* * * * *